United States Patent [19]

Shimizu

[11] Patent Number: 4,924,457
[45] Date of Patent: May 8, 1990

[54] CONCENTRATOR SYSTEM WITH POLLING-RESPONSE MEANS FOR DETECTING FAILURES TO STOP TARIFF CHARGES ON LOCALLY ESTABLISHED INTRAOFFICE CALLS

[75] Inventor: Toshimitsu Shimizu, Tokyo, Japan

[73] Assignee: NEC Corporation, Tokyo, Japan

[21] Appl. No.: 321,924

[22] Filed: Mar. 13, 1989

[30] Foreign Application Priority Data

Mar. 11, 1988 [JP] Japan ................................. 63-57410

[51] Int. Cl.$^5$ .............................................. H04J 3/02
[52] U.S. Cl. ..................................... 370/56; 379/333; 455/54
[58] Field of Search ......................... 370/56, 13, 95.2; 379/333, 334, 337, 91; 455/54, 56

[56] References Cited

U.S. PATENT DOCUMENTS

| | | | |
|---|---|---|---|
| 3,778,555 | 12/1973 | Nordling et al. | 379/334 |
| 3,917,908 | 11/1975 | Galuccio | 379/334 |
| 4,021,618 | 5/1977 | Wurst | 370/56 |
| 4,070,551 | 1/1978 | Weir | 370/56 |
| 4,208,549 | 6/1980 | Polillo et al. | 379/148 |

Primary Examiner—Douglas W. Olms
Assistant Examiner—Min Jung
Attorney, Agent, or Firm—Sughrue, Mion, Zinn, Macpeak & Seas

[57] ABSTRACT

In a radio concentrator system, a master station and a terminal station cooperate with each other to establish connections between remote subscriber terminals and a public switched network through radio message channels. An intraoffice call is set up between first and second subscriber terminals through the connections established in the terminal and master stations via the network. Upon establishment of such an intraoffice call, the terminal and master stations clear their connections and reestablish local connections in the terminal station between the subscriber terminals. The master station transmits a polling signal at periodic intervals to the terminal stations, which responds to it by transmitting an acknowledgement signal as long as the local call is in progress. The master station detects if the acknowledgement signal is received in response to the polling signal. End-of-call indication is given to the network when the response is not received for a prescribed time interval to stop the tariff charges on the calling party.

7 Claims, 6 Drawing Sheets

TERMINAL STATION

CONCENTRATOR SYSTEM WITH POLLING-RESPONSE MEANS FOR DETECTING FAILURES TO STOP TARIFF CHARGES ON LOCALLY ESTABLISHED INTRAOFFICE CALLS

BACKGROUND OF THE INVENTION

The present invention relates generally to a concentrator system having a master station connected to a public switched tele-communications network and a terminal station that connects remote user terminals through commonly shared two-way channels to the public switched network, and more specifically to a concentrator system in which the terminal station locally establishes intraoffice connections for saving the channel resource by clearing the channels which were used to establish initial connections to the network to activate tariff charges on the calling party of the intraoffice call.

In most cases, the terminal station of the concentrator system is located in a remote, scarcely populated area where power supplies are not available. Solar collectors with backup storage batteries are employed for such terminal stations. However, the climate dependent nature of the solar battery system often results in a failure to keep the power supply voltage to the rated value. In addition, the long trip to the remote terminal station and the exposure to the weather can result in a tendency that the equipment receives less maintenance attention, causing equipment failures to occur. For channel saving purposes for local (or intraoffice) calls between subscribers of the same terminal station, connections are initially established through the common channel to the public switched network to initiate tariff charges on the calling party and then cleared, and local connections are reestablished in the terminal station to continue the call. If a trouble should occur in the terminal station, this will likely to result in the local connections being automatically cleared, interrupting the local call. However, the central station is not notified of this fact due to its failure to receive an end-of-call signal from the terminal station and the public switched network continues the operation of the tariff counter of the calling party. The counter will therefore be incremented indefinitely, and an undesirable situation results.

SUMMARY OF THE INVENTION

It is therefore an object of the present invention to discontinue the operation of the tariff counter of a calling party setting up a local call in the event that the master station of the system fails to receive an end-of-call signal from a troubled terminal station which serves a plurality of subscriber communications terminals.

According to one aspect of the invention, there is provided a method for operating a concentrator system having a master station connected to a public switched network and a terminal station serving a plurality of communications terminals. The method comprises establishing a first communication path between a first communication terminal and the network via the terminal and master stations and a second communication path between a second communication terminal and the network via the terminal and master stations and a third communication path in the network for connecting the first and second communication paths to establish an intraoffice call. A local communication path is then established in the terminal station between the first and second communications terminals and the first and second communication paths are cleared. The method includes transmitting a polling signal from the master station to the terminal station at periodic intervals, transmitting an acknowledgment signal from the terminal station to the master station in response to receipt of the polling signal when the intraoffice call is in progress, detecting the acknowledgment signal by the master station, and transmitting a signal from the master station to the public switched network when the response is not detected for a prescribed time interval indicating that the intraoffice call is terminated.

According to another aspect, the present invention provides a concentrator system having a master station which is adapted for connection to a public switched network and a terminal station which serves a plurality of subscriber communications terminals. The master station and the terminal station are interconnected by a plurality of two-way message channels which are commonly shared by the communications terminals for carrying their message signals and further interconnected by an uplink control channel and a downlink control channel for carrying necessary control signals. The terminal station responds to a call request from the communications terminals and to a downlink connect request from the master station transmitted through the downlink control channel by establishing a two-way connection between the communications terminals and the two-way message channels. The master station responds to an uplink connect request from the terminal station transmitted through the uplink control channel and to a downlink connect request from the public switched network by establishing a two-way connection between the two-way message channels and the public switched network. An intraoffice call can, therefore, be set up between first and second communications terminals through connections established in the terminal and central stations via the public switched network. Upon establishment of an intraoffice call between first and second communications terminals, the terminal station transmits a signal to the master station through the uplink control channel requesting it to clear the connections established in association with the intraoffice call and reestablishes a two-way local connection in the terminal station between the first and second communications terminals and clears the connections established in the terminal station in association with the intraoffice call. The master station transmits a polling signal through the downlink control channel at periodic intervals. The terminal station responds to it by transmitting an acknowledgment signal through the uplink control channel as long as the local call is in progress. The master station detects if the acknowledgment signal is received through the uplink control channel in response to the polling signal and gives an indication to the public switched network when the response is not received for a prescribed time interval that the call through the local connection has terminated.

Preferably, each of the central and terminal stations includes a subscriber memory for storing identifications of the first and second communications terminals. The master station recalls a pair of identifications from the associated memory and transmits the recalled identifications through the downlink control channel. The terminal station responds to it by detecting a coincidence between the identifications which are transmitted through the downlink control channel simultaneously with a polling signal and a pair of identifications stored in the associated memory. The acknowledgment signal is transmitted in response to the detection of the coincidence. A failure of the central station to receive an end-of-call signal due to data corruption or the like can also be detected by the absence of acknowledgment signals and the tariff counter is prevented from being indefinitely incremented.

BRIEF DESCRIPTION OF THE DRAWINGS

The present invention will be described in further detail with reference to the accompanying drawings, in which.

DETAILED DESCRIPTION

Figure 1:
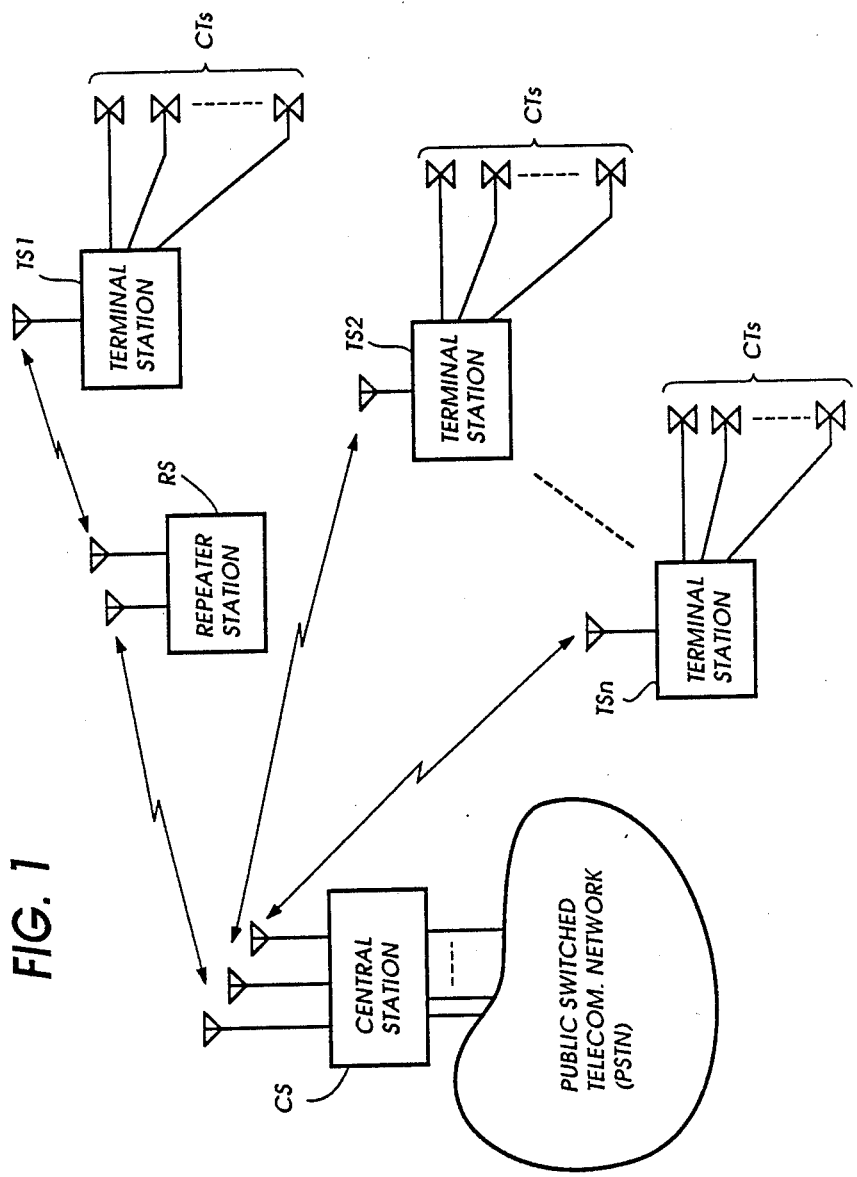
FIG. 1 is a schematic diagram of a TDM radio concentrator system of the invention.

A time division multiplexed radio concentrator system of the present invention is shown in FIG. 1. The concentrator system includes a plurality of remote terminal stations TS1 through TSn which are connected by respective two-way TDM (time division multiplex) radio channels to a master, or central station CS. As necessary, a repeater station RS may be provided to relay signals between terminal station TS1, for example, and the central station. Each terminal station serves a plurality of communications terminal equipments such as telephone and facsimile machines through subscriber lines. Central station CS is in turn connected to subscriber line terminals of a public switched telecommunications network PSTN.

Figure 2:
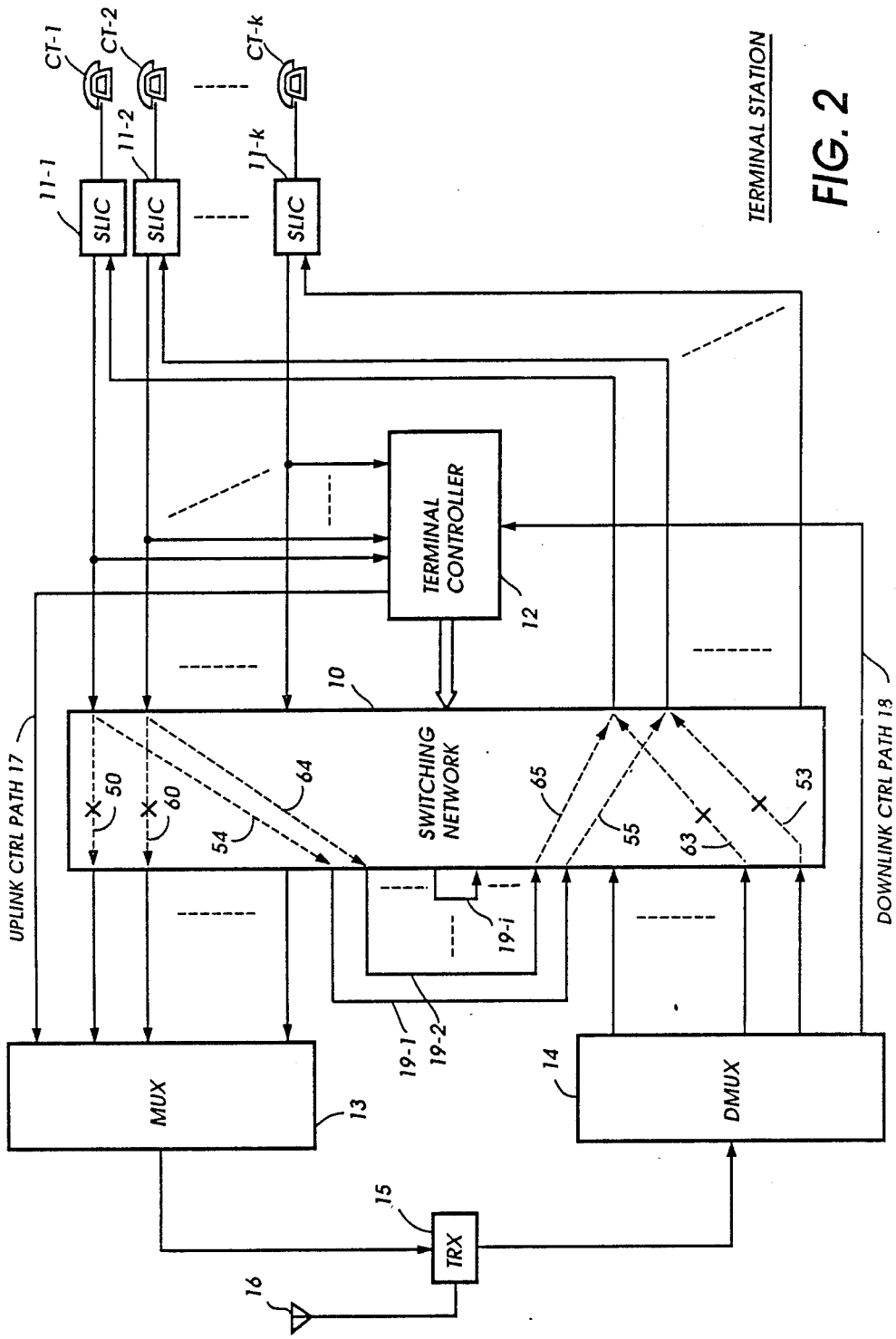
FIG. 2 is a block diagram of a terminal station of FIG. 1.

As illustrated in FIG. 2, each terminal station includes a switching network 10 and subscriber line interface circuits 11-1 through 11-k respectively associated with the subscriber's communications terminals CT-1 through CT-k. Each subscriber line interface circuit includes a hybrid that performs 2-wire/4-wire conversion between the user and network sides of the system. A terminal station controller, or simply a terminal controller 12, is associated with subscriber line interface circuit to receive call requests from communications terminals CT, report the call requests and supervisory information to the central station through an uplink control path 17 and receive various commands from the central station through a downlink control path 18. In response to a call request, terminal controller 12 controls the switching network 10 so that the output port of the calling-party interface circuit is coupled to an appropriate input port of a time division multiplexer 13 and, in response to an incoming connect command from the central station, it controls the network to establish a connection between an output port of a time division demultiplexer 14 and the input port of the called-party interface circuit. A plurality of intraoffice access terminals 19-1 through 19-i are connected to the switching network 10. On receipt of an intraoffice switching signal from the central station through downlink control path 18, controller 12 directs the network 10 to establish an intraoffice connection between subscribers served by the same terminal station through one of the intraoffice access terminals, while at the same time a connection established in the public switched telecommunications network PSTN is cleared. As will be described, this switching action is to save the message channel resource provided between the central station CS and each terminal station TS. However, the tariff charging of the calling party of the intraoffice call is continued in the PSTN.

Uplink message signals from the network 10 and an uplink control signal on the control path 17 are multiplexed into a TDM frame by the multiplexer 13 and applied to the transmit port of a transceiver 15 where it is modulated upon a carrier for radio transmission via antenna 16 to the central station CS. A TDM downlink radio signal from the central station is received by antenna 16 and demodulated by the transceiver 15 and fed to the input port of demultiplexer 14 where it is demultiplexed into downlink message signals for coupling to the network 10 and a downlink control signal for coupling to the controller 12 through the control path 18.

Figure 4:
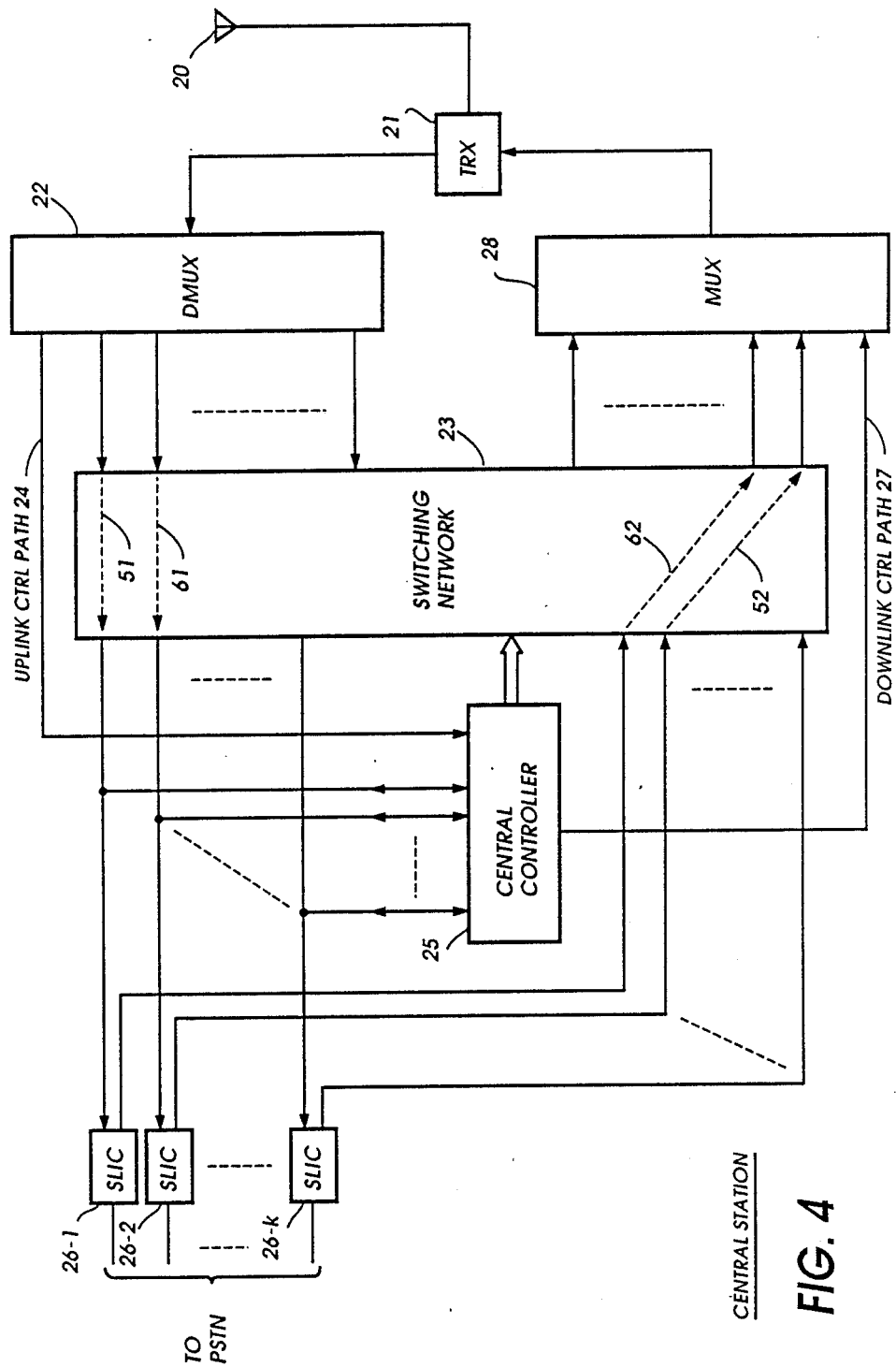
FIG. 4 is a block diagram of the central station of FIG. 1.

Details of the central station CS are shown in FIG. 4. Two-way TDM radio signals to and from each one of the terminal stations are sent and received via antenna 20 and the necessary modulation and demodulation are provided by a transceiver 21. Demodulated TDM signal is applied to a demultiplexed by a time-division demultiplexer 22 into uplink message signals for application to a switching network 23 and an uplink control signal which is applied on an uplink control path 24 to a central controller 25. A plurality of subscriber line interface circuits 26-1 through 26-k are provided in a one-to-one correspondence with the subscriber line interface circuits 11-1 through 11-k of the associated terminal station so that each subscriber of the concentrator system has a corresponding subscriber line interface circuit 26 in the central station. Line interface circuits 26-1 through 26-k are connected to the associated line terminals of the public switched telecommunications network PSTN. Similar to the line interface circuits of each terminal station, the line interface circuits 26 perform 2-wire/4-wire conversion between the PSTN and the switching network 24 by coupling switched uplink message signals from the network 24 as well as control signals to and from controller 25 to the PSTN and coupling downlink message signals from the PSTN to the network 24. In accordance with the control signal. The output of controller 25 is coupled by way of a downlink control path 27 to a time division multiplexer 28 to which switched downlink message signals from the network 23 are also applied. The downlink control signal is multiplexed with message signals into a downlink TDM signal and applied to the transmit port of the transceiver 21 for carrier modulation and transmission to the associated terminal station.

Figure 5:
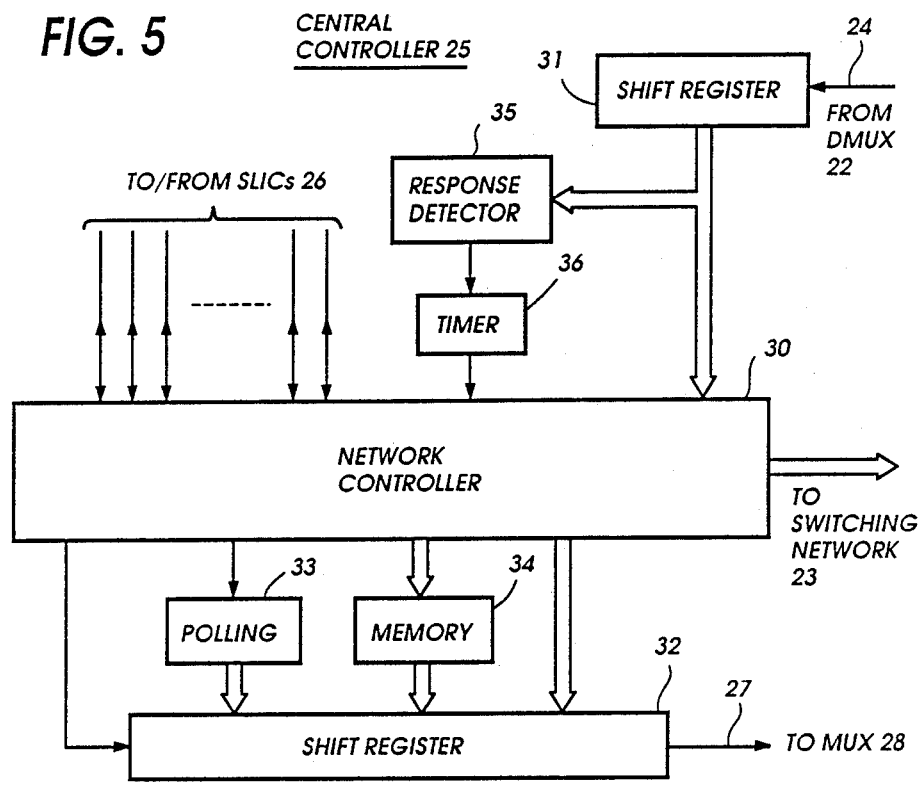
FIG. 5 is a block diagram of the central controller of FIG. 4.

As illustrated in FIG. 5, central controller 25 includes a network controller 30, an incoming shift register 31 for storing an uplink control signal supplied through control path 24 from demultiplexer 22, and an outgoing shift register 32 to form a downlink control channel for application to multiplexer 28 through downlink control path 27. Line interface circuits 26 are connected to the network controller 30 to exchange call-processing control signals between it and the PSTN to permit the controller 30 to control the switching network 23 in a known manner. Network controller 30 has a channel memory, not shown, in which idle/busy status of all message channels of the up and down links are recorded to permit selection of idle channels when establishing a two-way connection in the central station switching network 23.

According to the present invention, a supervisory polling generator 33 is connected to the network controller 30 in order to elicit a response from the associated terminal station to detect if it has failed due to equipment trouble or power outage during the time an intraoffice call is in progress. Polling generator 33 supplies a supervisory signal at periodic time intervals to outgoing shift register 32, where it is multiplexed with other call-processing signals to form a control channel and fed to the multiplexer 28 to be multiplexed with message channels. A subscriber memory 34 is provided for storing the directory numbers of subscribers which are involved in intraoffice calls and supplying the stored numbers to the controller 30 to be multiplexed with the polling signal. A response detector 35 is connected to the shift register 31 to detect a response signal from the terminal station and activate a timer 36 to initiate a timeout action when a response is returned from the terminal station. If a predefined timeout period is elapsed, timer 36 supplies an output signal to the network controller 30. The latter interprets this signal as the occurrence of an emergency that a terminal station is being in trouble and reports this fact to the PSTN through the line interface circuit 26 of the calling party of the intraoffice call by applying to it a signal identical to an end-of-call signal. In this way, the tariff charging of the calling party is terminated.

Figure 6:
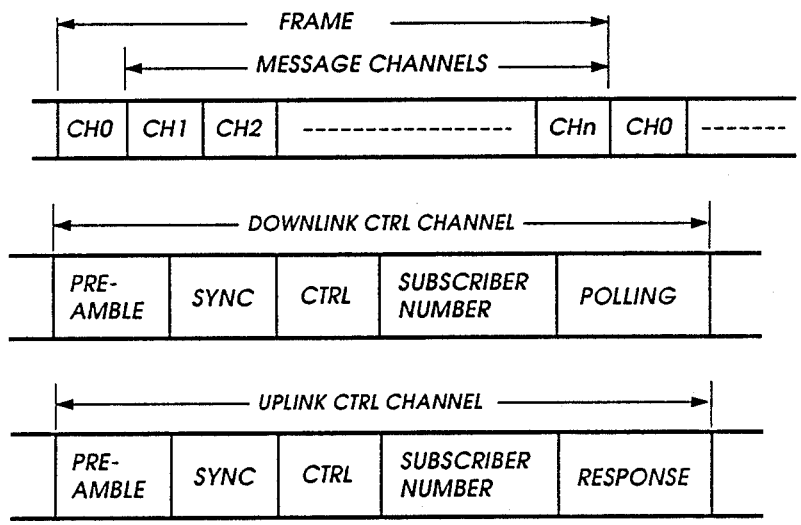
FIG. 6 is an illustration of data structures of the uplink and downlink TDM frames.

Multiplexer 28 provides multiplexing of switched downlink message signals from network 23 and control signals from central controller 25 into a frame format as shown in FIG. 6. A single frame is partitioned into a downlink control channel CH0 and a series of message channels CH1 through CHn. The downlink control channel is in turn divided into a preamble, a sync field, a control field, a subscriber directory number field and a supervisory polling field. The call-processing signals are entered to the control field, and the supervisory polling signal and directory numbers of calling and called parties currently participating in an intraoffice call are respectively entered to the polling and subscriber number fields of the same control channel. Overhead bits including preamble and frame sync are also supplied from the network controller 30 to the shift register 32 to form a downlink control channel and supplied to multiplexer 28 to be multiplexed with message channels.

The downlink TDM frame from the central station is demultiplexed by the demultiplexer 14 of a terminal station TS (FIG. 2). Signals on the control channel of the frame are coupled on control path 18 to the terminal controller 12 and signals on the message channels are switched by network 10 to appropriate line interface circuits 11 in accordance with switching control signals contained in the control field.

Figure 3:
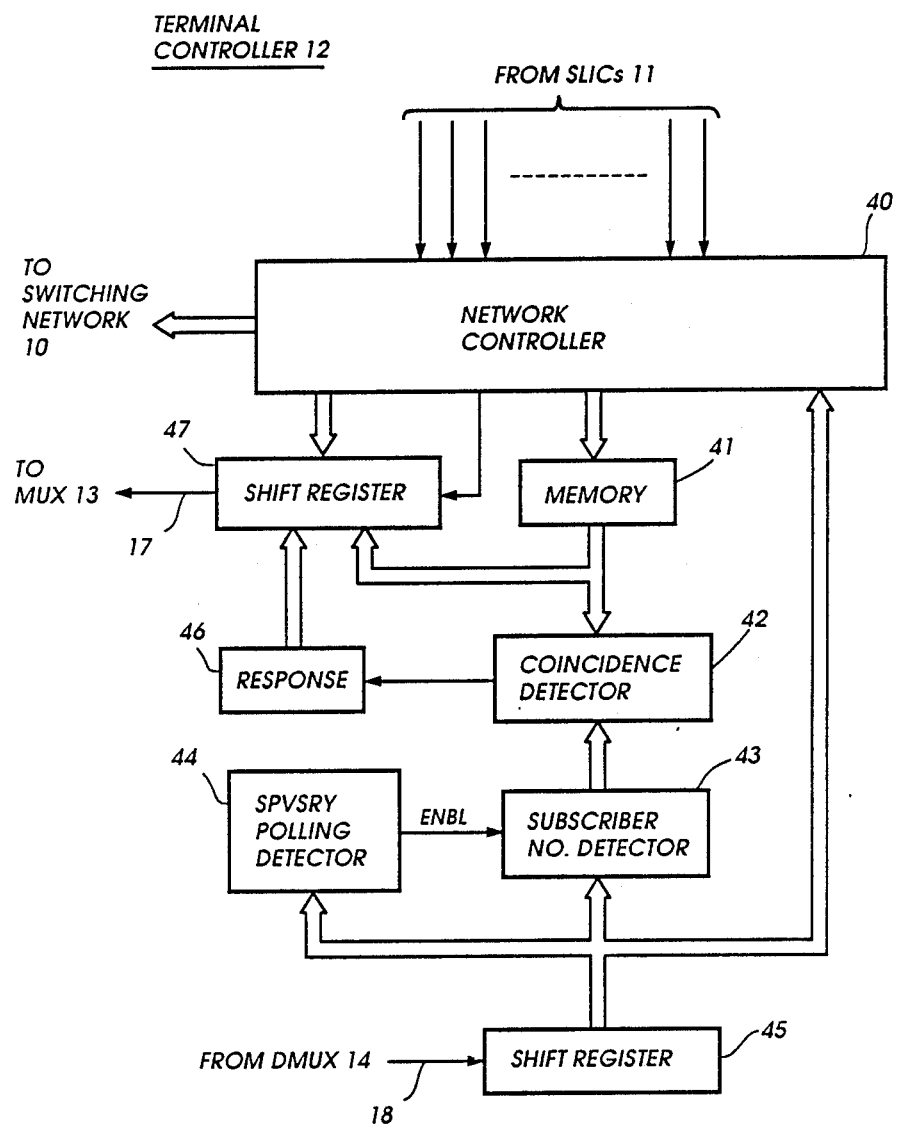
FIG. 3 is a block diagram of the terminal controller of FIG. 2.

Details of the terminal controller 12 are shown in FIG. 3. As illustrated, controller 12 includes a network controller 40 which is provided with a channel memory, not shown, to record idle/busy status of all message channels of the uplink and downlink to permit selection of idle channels when establishing connections in the terminal station switching network 10. A subscriber memory 41 is provided to store directory numbers of calling and called parties participating in intraoffice calls. A coincidence detector 41 is connected between the memory 41 and a subscriber number detector 43. The control channel on path 18 is supplied to an incoming shift register 45. The contents of shift register 45 are loaded into the subscriber number detector 42 and supervisory polling detector 44 for purposes of detecting the directory numbers and polling signal contained in the control channel, as well as to the controller 40 for switching and signaling purposes. On detecting a supervisory polling signal, detector 44 enables the subscriber number detector 43 to apply the directory numbers transmitted from the central station to the coincidence detector 42 to detect if they match with those stored in memory 41. If they match, coincidence detector 42 supplies an output to a response generator 46, the output of which is applied to an outgoing shift register 47. The directory numbers of the calling and called subscribers participating in the intraoffice call are loaded into shift register 47 from memory 41 and overhead bits including preamble, frame sync and call-processing signals are further loaded from the network controller 40 to form an uplink control channel CH0. As shown in FIG. 6, the format of the uplink control channel is similar to the downlink control channel with the exception that the polling field is replaced with a response field. The output of shift register 47 is coupled to the control path 17 to bit serially feed the loaded signals to multiplexer 13. An uplink TDM frame is generated by multiplexing uplink message channels CH1 to CHn with the uplink control channel CH0 in a manner identical to the downlink TDM frame.

Figure 7:
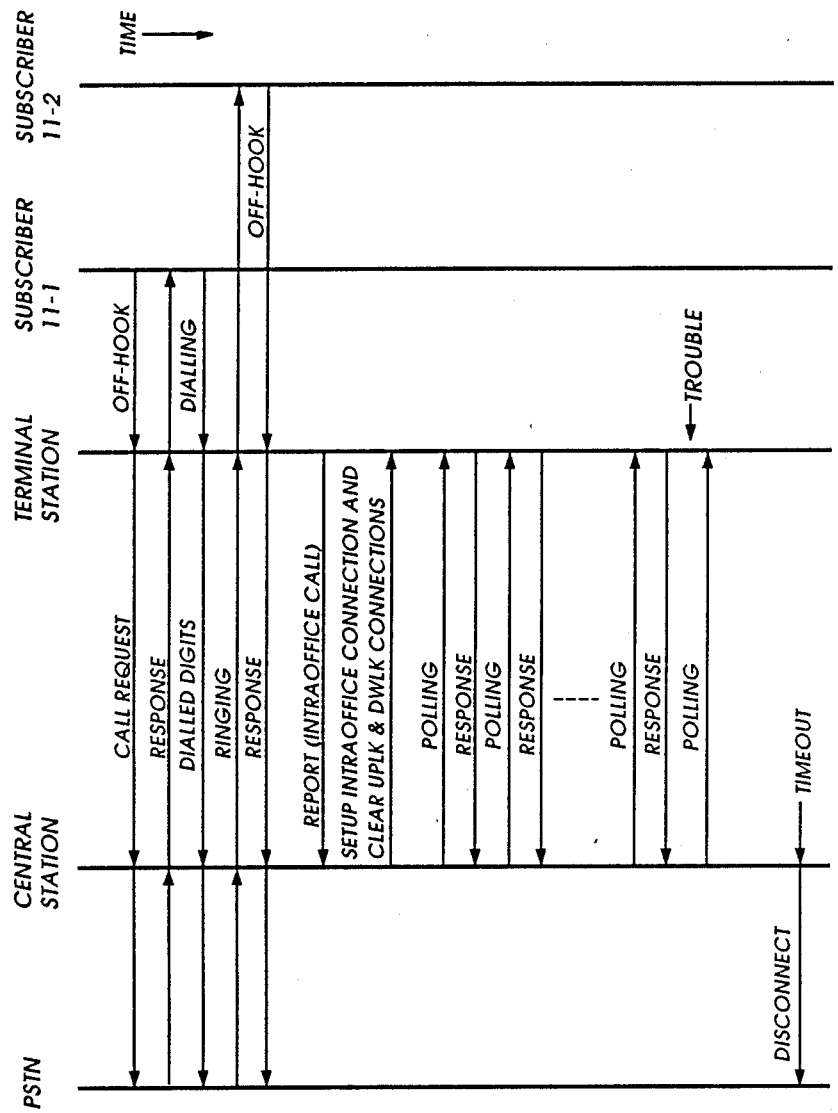
FIG. 7 is a sequence chart useful for describing the operation of the present invention.

The operation of the concentrator system will be described with reference to FIG. 7. Assume that a call request is placed from communications terminal CT-1 for establishing an intraoffice call to communications terminal CT-2, for example. On detecting an off-hook signal from the terminal CT-1, controller 12 selects idle uplink and downlink message channels and establishes an uplink connection 50 through the network 10 between the output port of interface circuit 11-1 and an input port of the multiplexer 13 that corresponds to the selected message channel and a downlink connection 53 between the input port of interface circuit 11-1 and an output of demultiplexer 14 that corresponds t the selected downlink message channel and enters the selected message channel numbers and the directory number of the calling party into the control channel of an uplink TDM frame. At the same time, controller 12 stores the directory number of the calling party into the memory 41.

On receipt of this frame, central controller 25 inspects the contents of its control channel and requests the PSTN to establish a dial-tone connection and establishes an uplink connection 51 between the input port of interface circuit 26-1 and an output port of demultiplexer 22 which corresponds to the uplink message channel selected by the terminal station and a downlink connection 52 between the output port of interface circuit 26-1 and an input port of multiplexer 29 that corresponds to the selected downlink message channel. In this way, a dial tone, or proceed-to-dial signal, from the PSTN is transmitted through the downlink connections 52 and 53 established in the central and terminal stations to the calling subscriber terminal CT-1. On hearing the dial tone, the calling party sends dialled digits through the switched uplink connections 50 and 51 to the PSTN. The dialled digits are also received by the terminal controller 12 and the directory number of the called subscriber is stored into the memory 41 in a location addressable as a function of the directory number of the calling party.

On receipt of the dialled digits, the PSTN establishes a ringing connection between the interface circuits 26-1 and 26-2 and requests the central controller 25 to select idle uplink and downlink message channels. An uplink connection 61 is established in the network 23 between the input port of interface circuit 26-2 and an output port of demultiplexer 22 that corresponds to the selected uplink message channel and a downlink connection 62 between the output port of the interface circuit 26-2 and an input port of multiplexer 28 that corresponds to the selected downlink message channel. Controller 25 enters the selected channel numbers to the control channel of a downlink TDM frame. On receiving this frame, terminal controller 12 inspects the contents of its control channel and establishes an uplink connection 60 between the output port of interface circuit 11-2 and an input port of multiplexer 13 that corresponds to the uplink message channel selected by the central station, and further establishes a downlink connection 63 between the input port of interface circuit 11-2 and an output port of demultiplexer 14 that corresponds to the selected downlink message channel. A ringing signal is then sent from the PSTN to the called subscriber terminal CT-2 through the downlink connections 62 and 63 and a ring-back tone to the calling subscriber terminal CT-1 through the downlink connections 52 and 53.

When the call is answered, the PSTN senses an off-hook state of the called subscriber terminal CT-2 through the uplink connections 60 and 61 and ceases to transmit the ringing signal as well as the ring-back tone. The PSTN operates the tariff counter of the calling party to start charging the calling party.

With the directory numbers of terminals CT-1 and CT-2 being stored in the memory 41, terminal controller 12 knows that an intraoffice call has started between them and communicates this fact to the central station through the uplink control channel CH0 and proceeds to set up a series of intraoffice connections 54,55 in the network 10 between the output port of interface circuit 11-1 and the input port of interface 11-2 and a series of intraoffice connections 64,65 between the output port of interface circuit 11-2 and the input port of interface 11-1. Controller 12 then directs the switching network 10 to clear the connections 50,53,60, and 63. Central controller 25 responds to the communication from the terminal station by clearing the connections 51,52,61 and 62 and in turn causes the calling party interface circuit 26-1 to keep the connection established between it and the called interface circuit 26-2 in order to continue the operation of the tariff counter of the calling party.

Central controller 25 now starts the supervisory polling circuit 33 so that a supervisory polling signal and the directory numbers of the calling and called terminals CT-1 and CT-2 are entered to the control channel of a downlink TDM frame and transmitted at frame intervals to the terminal station through the downlink control channel CH0.

When the intraoffice call is in progress, terminal controller 12 sends back an acknowledgment signal in response to each polling signal through the uplink control channel CH0. Response detector 35 of the central station detects the acknowledgment signal from the uplink control signal and activates the timer 36. Timer 36 is therefore periodically activated as long as the intraoffice call continues. When the intraoffice connections are cleared at the end of the intraoffice call, an end-of-call signal is transmitted from the terminal station through the uplink control channel. In the central station, network controller 30 detects the end-of-call signal from the uplink control channel and applies a disconnect command signal to the interface circuit 26-1 to discontinue the operation of its tariff counter in the PSTN.

A sequence of similar events takes place if the terminal station should fail due to a sharp voltage drop or equipment failure while the intraoffice call is in progress since such abnormal conditions cause the intraoffice connections to be cleared or no acknowledgment signal is transmitted back to the central station. At the central station, timer 36 eventually supplies a timeout signal to network controller 30. Being informed of an emergency situation, network controller 30 applies a disconnect command signal to the interface circuit 26-1 to discontinue the operation of its tariff counter. Therefore, the calling party of an intraoffice call is prevented from being charged indefinitely due to equipment or power failure of the terminal station.

A termination of an intraoffice call results in the erasure of the corresponding directory numbers from both memories 41 and 34. However, a failure of the network controller 40 to transmit an end-of-call signal or a failure of the network controller 30 to correctly receive that signal due to data corruption or lost, is likely to result in a failure of controller 30 to erase the corresponding directory numbers from memory 34. If this type of errors occurs, the transmission of polling signals is still continued in the central station and the coincidence detector 42 in the terminal station generates no output. Thus, no response is transmitted back to the central station and the central station reports an end-of-call status to the PSTN as in the case of a system failure of the terminal station.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for operating a concentrator system having a master station connected to a public switched network and a terminal station serving a plurality of communications terminals, comprising:

establishing a first communication path between a first communication terminal and said network via said terminal and master stations and a second communication path between a second communication terminal and said network via said terminal and master stations and a third communication path in said network for connecting said first and second communication paths to establish an intraoffice call;

establishing a local communication path in said terminal station between said first and second communications terminals and clearing said first and second communication paths;

transmitting a polling signal from said master station to said terminal station at periodic intervals;

transmitting an acknowledgment signal from said terminal station to said master station in response to receipt of said polling signal when said intraoffice call is in progress;

detecting said acknowledgment signal by said master station; and transmitting a signal from said master station to said public switched network when said response is not detected for a prescribed time interval indicating that said intraoffice call is terminated.

2. A concentrator system as claimed in claim 1, wherein each of said master and terminal stations includes a memory for storing identifications of said first and second communications terminals, further comprising:

recalling a pair of identifications from the memory of said master station;

transmitting the recalled identifications from said master station to said terminal station;

detecting a coincidence between the identifications from said master station and a pair of identifications stored in said memory of said terminal station; and transmitting said acknowledgment signal from said terminal station to said master station in response to the detection of said coincidence.

3. A concentrator system having a master station adapted for connection to a public switched network and a terminal station serving a plurality of communications terminals, said master station and said terminal station being interconnected by a plurality of two-way message channels and by an uplink control channel and a downlink control channel, comprising:

terminal station switching means responsive to a call request from said communications terminals and to a downlink connect request from said master station transmitted through said downlink control channel for establishing a two-way connection in said terminal station between said communications terminals and said two-way message channels;

master station switching means responsive to an uplink connect request from said terminal station transmitted through said uplink control channel and to a downlink connect request from said public switched network for establishing a two-way connection in said master station between said two-way message channels and said public switched network, whereby an intraoffice call can be set up between first and second communications terminals through said two-way connections in said terminal and master stations via said public switched network;

said terminal station switching means further including means for transmitting a signal to said master station through said uplink control channel requesting said master station switching means to clear the connections established therein in connection when said intraoffice call is set up, establishing a two-way local connection in said terminal station between said first and second communications terminals and clearing the connections established in said terminal station in association with said intraoffice call, and said master station switching means being responsive to said requesting signal to clear the connections established therein in connection with said intraoffice call;

master station polling means for transmitting a polling signal through said downlink control channel at periodic intervals;

master station detector means for detecting if an acknowledgment signal is received through said uplink control channel in response to said polling signal and giving an indication to said public switched network when said response is not received for a prescribed time interval that a communication through said local connection has terminated; and terminal station response means for transmitting said acknowledgment signal through said uplink control channel in response to receipt of said polling signal when said communication is in progress.

4. A concentrator system as claimed in claim 3, wherein said terminal station includes a first memory for storing identifications of said first and second communications terminals, and wherein said master station includes a second memory for storing said identifications of said first and second communications terminals, said master station polling means further comprising means for recalling a pair of identifications from said second memory and transmitting the recalled identifications through said downlink control channel, said terminal station response means further comprising means for detecting a coincidence between the identifications transmitted through said downlink control channel simultaneously with said polling signal and a pair of identifications stored in said first memory, said acknowledgment signal being transmitted in response to the detection of said coincidence by said detecting means.

5. A concentrator system as claimed in claim 3, wherein said two-way message channels and said uplink and downlink control channels are time division multiplexed into respective time slots of a two-way radio link.

6. A concentrator system as claimed in claim 3, wherein said polling means transmits said polling signal after said connections are cleared.

7. A concentrator system as claimed in claim 4, wherein said polling means transmits said polling signal after said connections are cleared.

* * * * *